United States Patent
De Jong et al.

(10) Patent No.: US 10,505,931 B2
(45) Date of Patent: Dec. 10, 2019

(54) METHOD FOR AUTHENTICATING AN INTEGRATED CIRCUIT DEVICE

(71) Applicant: NXP B.V., Eindhoven (NL)

(72) Inventors: Hans De Jong, Eindhoven (NL); Jan Rene Brands, Nijmegen (NL)

(73) Assignee: NXP B.V., Eindhoven (NL)

( * ) Notice: Subject to any disclaimer, the term of this patent is extended or adjusted under 35 U.S.C. 154(b) by 188 days.

(21) Appl. No.: 15/611,904

(22) Filed: Jun. 2, 2017

(65) Prior Publication Data

US 2018/0351948 A1 Dec. 6, 2018

(51) Int. Cl.
| | |
|---|---|
| *H04L 29/06* | (2006.01) |
| *H04L 12/24* | (2006.01) |
| *H04L 9/08* | (2006.01) |
| *H04L 9/32* | (2006.01) |
| *H04W 12/04* | (2009.01) |

(52) U.S. Cl.
CPC ........ *H04L 63/0876* (2013.01); *H04L 9/0866* (2013.01); *H04L 9/3271* (2013.01); *H04L 41/28* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 5,787,021 A | 7/1998 | Samaha | |
| 6,968,060 B1* | 11/2005 | Pinkas | H04L 9/08 380/277 |
| 7,011,245 B1* | 3/2006 | Hu | G07D 7/0047 235/375 |
| 7,734,915 B2* | 6/2010 | Neill | G06F 21/72 713/165 |
| 8,972,721 B2 | 3/2015 | Neill et al. | |
| 9,239,920 B2* | 1/2016 | Ashkenazi | H04L 9/0866 |
| 9,430,658 B2* | 8/2016 | Covey | G06F 21/572 |

(Continued)

FOREIGN PATENT DOCUMENTS

EP 2388949 A1 11/2011

OTHER PUBLICATIONS

U.S. Appl. No. 15/377,840, filed Dec. 13, 2016, and titled "Distributed Cryptographic Key Insertion and Key Delivery".

*Primary Examiner* — Saleh Najjar
*Assistant Examiner* — Michael W Chao
(74) *Attorney, Agent, or Firm* — Daniel D. Hill

(57) ABSTRACT

A method is provided for authenticating an IC device. The method includes provisioning an integrated circuit (IC) device with a unique identification number (UID). The IC device is configured to calculate a device-specific key (DSK) using the UID. The UID is used with a secure application separate from the IC device to calculate the DSK. The DSK calculated by the IC device is the same as the DSK calculated by the secure application. The UID and the DSK calculated by the secure application is provided to a provider of an online service. The provider of the online service is enabled to authenticate the IC device using the UID and the DSK calculated with the secure application in response to the IC device contacting the online service. The provider may authenticate the device using a standard cryptographic challenge-response protocol. If the IC device has knowledge of a particular DSK, then the IC device is a legitimate authorized device.

20 Claims, 2 Drawing Sheets

(56) References Cited

U.S. PATENT DOCUMENTS

| | | | |
|---|---|---|---|
| 2003/0158775 A1* | 8/2003 | Chaum | G07C 13/00 705/12 |
| 2003/0174844 A1* | 9/2003 | Candelore | G06Q 20/3674 380/277 |
| 2004/0109567 A1* | 6/2004 | Yang | G06F 21/608 380/277 |
| 2007/0106892 A1* | 5/2007 | Engberg | G06Q 20/02 713/168 |
| 2010/0250936 A1* | 9/2010 | Kusakawa | H04L 9/3278 713/169 |
| 2014/0064480 A1* | 3/2014 | Hartley | H04L 9/0866 380/30 |
| 2014/0317417 A1* | 10/2014 | Ashkenazi | H04L 9/0866 713/189 |
| 2015/0113275 A1* | 4/2015 | Kim | H04L 9/3273 713/169 |
| 2015/0278505 A1* | 10/2015 | Lu | H04L 9/0866 726/19 |
| 2015/0312228 A1* | 10/2015 | McLean | H04L 9/3247 713/175 |
| 2016/0028722 A1* | 1/2016 | Kocher | H04L 9/083 713/156 |
| 2016/0044012 A1* | 2/2016 | Carrer | H04W 4/70 726/6 |
| 2016/0164725 A1* | 6/2016 | Wu | H04W 76/10 713/168 |
| 2016/0171223 A1* | 6/2016 | Covey | G06F 21/572 713/189 |
| 2016/0261565 A1* | 9/2016 | Lorenz | H04L 63/045 |
| 2017/0048070 A1* | 2/2017 | Gulati | H04L 9/3268 |
| 2017/0142083 A1* | 5/2017 | Kumar | H04W 12/04 |
| 2018/0144147 A1* | 5/2018 | Nix | H04W 12/04 |

* cited by examiner

METHOD FOR AUTHENTICATING AN INTEGRATED CIRCUIT DEVICE

BACKGROUND

Field

This disclosure relates generally to integrated circuits and more specifically to a method for authenticating an integrated circuit device.

Related Art

In contract manufacturing for integrated circuits, the design and development is done by an original device manufacturer (ODM), but the actual integrated circuit device production may be outsourced to a third-party contract manufacturer. This creates the risk for the ODM that illicit clones of the original devices are created through overproduction runs by the contract manufacturer, where the production chain of the original devices is misused for the creation of extra units. These extra units are not manufactured under the control of the ODM and the manufacturing cost will also not be paid by them. These extra units are in effect identical to the legitimate units (except perhaps for quality control), but may be considered as illicit clones, as they will not be sold through the ODM's channels.

The sale of the illicit devices not only affects the ODM's business, but may also affect the functionality of the legitimate devices. In a situation where the manufactured devices are functionally dependent on an on-line service provider, as is typically the case for internet of things (IoT) devices, such cloned devices, when sold to end users, may adversely affect the availability of the on-line service, and through that the overall functioning of all sold devices, including the legitimate devices.

If more devices than expected access and make use of the on-line service, more network traffic can result (simultaneously and overall), potentially exceeding the available bandwidth, and cause more transactions (perhaps with accompanying calculations, bookkeeping, data storage, etc.). As a result, this could undermine the stability and availability of the on-line service, forcing the service provider to invest in more capacity (both bandwidth and computation power). This may in turn adversely affect the business viability of the online service itself.

Therefore, a need exists for a method to detect the illicit devices and thus prevent the unauthorized use of bandwidth and computation power.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
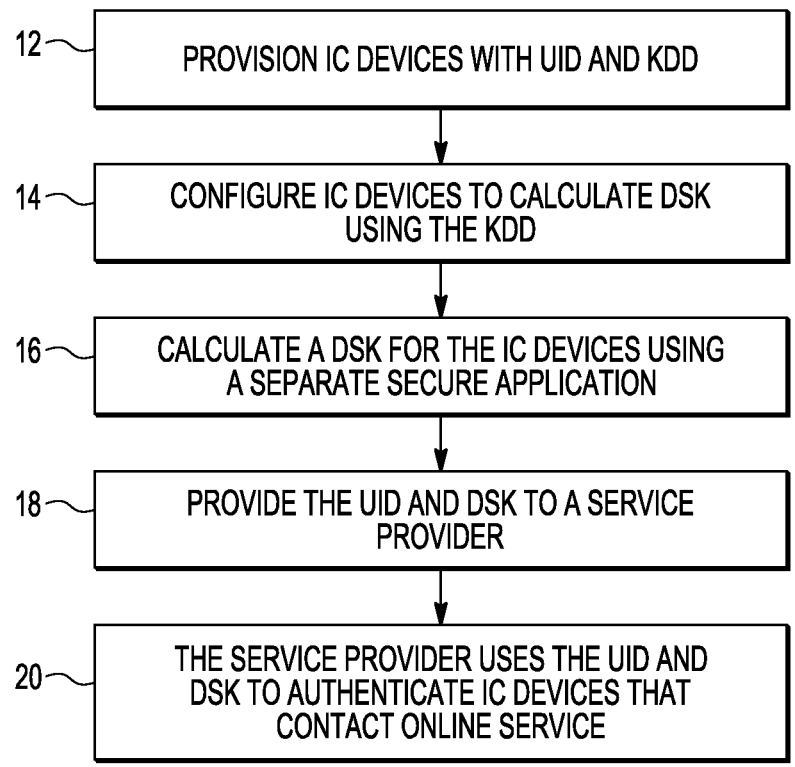
FIG. 1 illustrates a flowchart for a method for authenticating an IC device in accordance with an embodiment.

Generally, there is provided, a method for authenticating an integrated circuit (IC) device. The method includes provisioning the IC device with a unique identification number (UID), and configuring the IC device to calculate a device-specific key (DSK) using the UID. The UID is used with a secure application separate from the IC device to calculate the DSK. The DSK calculated by the IC device is the same as the DSK calculated by the secure application. The UIDs of the IC devices are collected during manufacturing of the IC devices. The UID and the DSK calculated by the secure application is provided to a provider of an online service. The provider of the online service is thus enabled to authenticate the IC device using the UID and the DSK that was calculated with the secure application in response to the IC device contacting the online service. The service provider may authenticate the device using a standard cryptographic challenge-response protocol. If the IC device has knowledge of a particular DSK, then the IC device is a legitimate authorized device. An illicit IC device will not have knowledge of the particular DSK.

In accordance with an embodiment, there is provided, a method including: provisioning an integrated circuit (IC) device with a unique identification number (UID); configuring the IC device to calculate a device-specific key (DSK) using the UID; using the UID and a secure application separate from the IC device, calculating a DSK for the IC device; providing the UID and the DSK calculated with the secure application separate from the IC device to a provider of an online service; and enabling the provider of the online service to authenticate the IC device using the UID and the DSK calculated with the secure application in response to the IC device contacting the online service. Provisioning an integrated circuit (IC) device with a unique identification number (UID) may further include provisioning a plurality of IC devices, each with a UID. The method may further include creating a log file of a UID and corresponding DSK for each of the plurality of IC devices. Creating a log file of a UID and corresponding DSK for each of the plurality of IC devices may further include providing the log file to the provider of the online service. Enabling the provider of the online service to authenticate the IC device may further include enabling the provider of the online service to authenticate the IC device using a predetermined cryptographic challenge-response protocol. The IC device may be authenticated as a legitimately manufactured IC device when the DSK calculated by the IC device favorably matches the DSK calculated with the secure application. Provisioning the IC device with the UID may be performed by a IC manufacturer that manufactured the IC device for an original device manufacturer (ODM). The IC device may be characterized as being an internet of things (IoT) device. Using the UID and a secure application separate from the IC device, calculating a DSK for the IC device may further include calculating the DSK for the IC device by an original device manufacturer (ODM).

In another embodiment, there is provided, a method including: provisioning a plurality of integrated circuit (IC) devices with unique identification numbers, each of the plurality of IC devices being provided with a unique identification number (UID); configuring each of the plurality of IC devices to calculate a device-specific key (DSK) using the UID; using the UID and a secure application separate from the IC device, calculating a DSK for each of the plurality of IC devices; providing the UIDs and the DSKs calculated with the secure application separate from the IC device to a provider of an online service; and enabling the provider of the online service to authenticate an IC device using the UIDs and the DSKs calculated with the secure application in response to the IC device contacting the online service. The method may further include creating a log file of a UID and corresponding DSK for each of the plurality of IC devices. Creating the log file of a UID and corresponding DSK for each of the plurality of IC devices may further include providing the log file to the provider of the online service. Enabling the provider of the online service to authenticate the IC device may further include enabling the provider of the online service to authenticate the IC device using a predetermined cryptographic challenge-response protocol. The IC device may be authenticated as a legitimately manufactured IC device when the DSK calculated by the IC device favorably matches the DSK calculated with the secure application. Provisioning the plurality of IC devices with the UIDs is performed by an IC manufacturer that manufactured the plurality of IC devices for an original device manufacturer (ODM). The IC device may be characterized as being an internet of things (IoT) device. Using the UID and a secure application separate from the IC device, calculating a DSK for the IC device may further comprise calculating the DSK for the IC device by an original device manufacturer (ODM).

In yet another embodiment, there is provided, a method including: provisioning a plurality of integrated circuit (IC) devices with unique identification numbers, each of the plurality of IC devices being provided with a unique identification number (UID); configuring each of the plurality of IC devices to calculate a device-specific key (DSK) using the UID; using the UID and a secure application separate from the IC device, calculating a DSK for each of the plurality of IC devices; creating a log file of a UID and corresponding DSK for each of the plurality of IC devices; providing the log file of UIDs and DSKs calculated with the secure application separate from the IC device to a provider of an online service; and enabling the provider of the online service to authenticate an IC device using the UIDs and the DSKs calculated with the secure application in response to the IC device contacting the online service. The IC device may be authenticated as a legitimately manufactured IC device when the DSK calculated by the IC device favorably matches the DSK calculated with the secure application. Provisioning the plurality of IC devices with the UIDs may be performed by an IC manufacturer that manufactured the plurality of IC devices for an original device manufacturer (ODM).

FIG. 1 illustrates a flowchart of a method 10 for authenticating an IC device in accordance with an embodiment. Using method 10, it can be determined if an IC device is a legitimate device manufactured with the authorization of an original device manufacturer, or if the device is an illicit, unauthorized, clone device. A provider of online services may use method 10 to detect devices not authorized to use an online service. Method 10 starts at step 12. At step 12, an IC device is provisioned with a unique identification number (UID) and key derivation data (KDD). Generally, the IC manufacturer of the device, which may be a contract manufacturer, does the provisioning. The UID of each device manufactured is provided to the original device manufacturer (ODM). At step 14, the IC devices are each configured with an algorithm and parameters to calculate a secret device specific key (DSK) using the KDD. The calculation of the DSK will be discussed below. At step 16, the ODM uses the UIDs and a secure application, separate from the IC devices to derive and calculate the secret DSKs for the IC devices. The DSKs calculated by the IC devices matches the DSKs calculated by the ODM using the secure application. A log file may be created with all of the UIDs and corresponding DSKs. At step 18, the log file for UIDs and corresponding DSKs may be provided to a provider of online services. The IC devices may be characterized as being internet of things (IoT) devices, and the online service provider may provide a specific IoT service on, for example, a subscription basis. At step 20, the service provider uses the UIDs and DSKs to authenticate IC devices that contact the online service. If the UID is known to the service provider, and the UIDs and DSKs match, then the IC device has knowledge of the DSK used by the service provider and is therefore an original IC device. If the UIDs and DSKs do not match, then the IC device contacting the service may not be an original device. The service provider may then choose to deny access to the online service.

Figure 2:
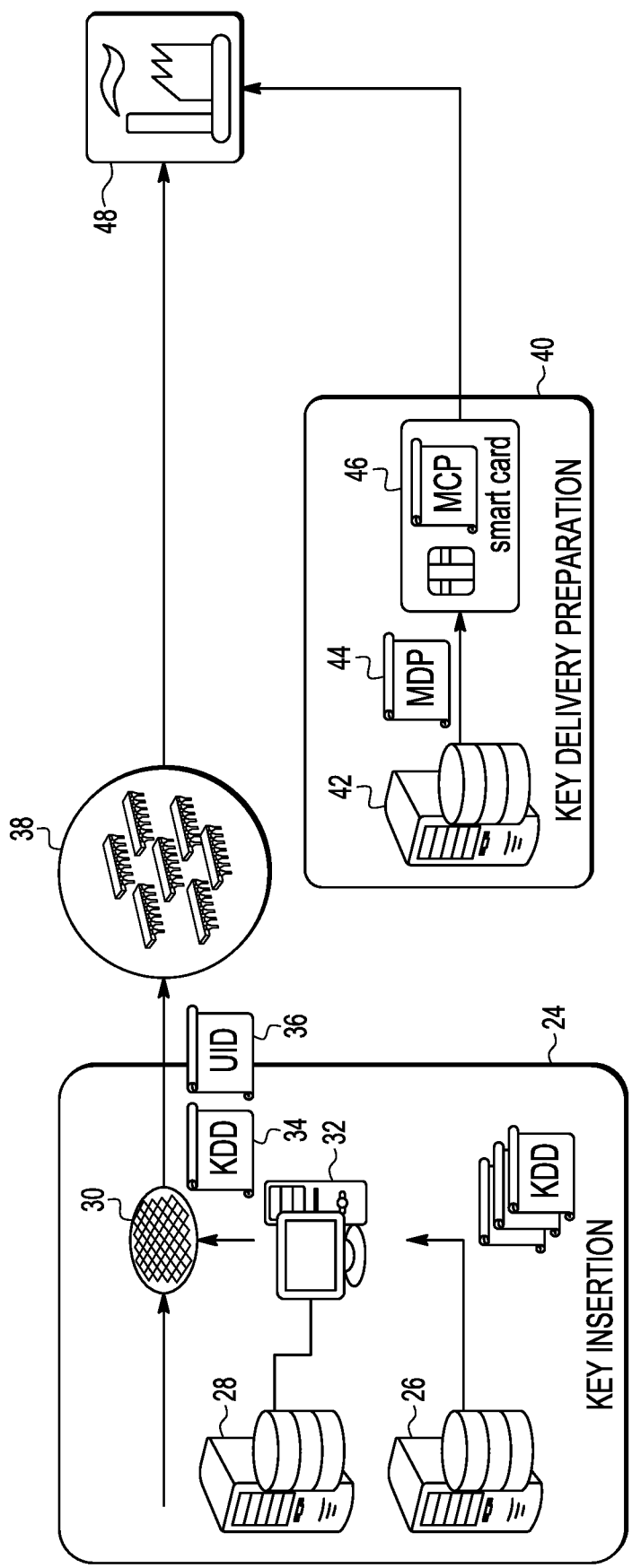
FIG. 2 illustrates a graphical view of cryptographical key insertion and key delivery for a plurality of IC devices in accordance with an embodiment.

FIG. 2 illustrates a graphical view of cryptographical key insertion and key delivery for a plurality of IC devices in accordance with an embodiment. Referring to FIG. 2, key insertion 24 may be performed by the IC manufacturer. A semiconductor wafer 30 is processed by the IC manufacturer to have a plurality of semiconductor die. The semiconductor die are singulated and packaged to provide a plurality of IC devices 38. During key insertion 24, a UID database 28 and a key insertion server 26 communicate with a wafer tester 32. Tester 32 provisions each functional die of wafer 30 with UID 36 and key derivation data (KDD) 34. In one embodiment, UID 36 may be a serial number or other manufacturer generated code for uniquely identifying each particular die. UID 36 may be provided by the UID database 28 and KDD 34 may be provided by the key insertion server 26. The plurality of IC devices is provided to customer 48. Customer 48 may be, for example, an IoT device manufacturer or a distributor. If the customer is an IoT device manufacturer, the customer may include the IC device in an IoT device. Note that the customer may also acquire the IC devices from a distributor. The IC manufacturer does not need to have a direct delivery channel to the customer to still be able to achieve a unique key for each die that will only be known to that die and the customer. To prepare a device specific key (DSK) for each of the plurality of devices, key delivery preparation 40 may include using a server 42 to configure, for example, a smart card 46 with a manufacturer diversification parameter (MDP) 44 that is specific to the customer. Smart card 46 is then provided to customer 48 by the ODM and customer 48 uses the MDP from smart card 46 to generate a product specific parameter (PSP) in accordance with key delivery process 40. The PSP may be a random number used by customer 48 to identify the particular product being manufactured. The MDP 44 and PSP is loaded onto each IC device purchased by the customer during the first boot-up, or initialization, of the IC devices. Alternately, MDP 44 and the PSP may be loaded onto each IC device by the contract manufacturer.

To calculate a DSK, the customer chooses a large prime p (length of the prime is at least 1024 bits), which can be made public. The customer also randomly chooses a generator $g \in_R \mathbb{Z}_p$ of the group of numbers modulo p. Then for each IC device, the customer chooses random Key Derivation Data $KDD \in_R \mathbb{Z}_p$ in the group of numbers modulo p and calculate $UID = g^{KDD} \bmod p$. The UID and the KDD are then programmed in the IC device during wafer testing. The UID and the KDD uniquely identify each IC. The customer chooses a random $MCP \in_R \mathbb{Z}_p$ in the group of numbers modulo p and calculates the corresponding manufacturer derivation parameter $MDP = g^{MCP} \bmod p$. The MCP is then programmed in the specially prepared smart card 46 and the MDP is provided to the ODM in the clear. This step is typically performed once per IC device. To produce the required additional parameters the customer generates a random Product Specific Key $PSK \in_R \mathbb{Z}_p$ and calculates a Product Specific Parameter $PSP = MDP^{PSK} \bmod p$.

The PSP is embedded inside a firmware image that is to be programmed inside each of the IC devices. The firmware image is then sent to the contract manufacturer to be put inside the IC devices. This step is typically done for each product (or group of products) that the ODM manufacturers. With all the data in place, the IC device inside the customer's IoT device can now derive its own unique Device Specific Key as follows: DSK=PSP$^{KDD}$ mod p. On the other side, the ODM can also calculate the same key using smart card 46 after the UID of the customer's IoT device has been transmitted to it. Smart card 46 calculates the temporary result k=UID$^{MCP}$ mod p and then DSK'=k$^{PSK}$ mod p.

To show that DSK' calculated by smart card 46 equals DSK that has been calculated by the IC device, note that $$DSK' = k^{PSK} \bmod p$$
$$= (UID^{MCP})^{PSK} \bmod p$$
$$= (g^{KDD})^{MCP \cdot PSK} \bmod p$$
$$= g^{KDD \cdot MCP \cdot PSK} \bmod p$$
$$= (g^{MCP})^{PSK \cdot KDD} \bmod p$$
$$= (MDP^{PSK})^{KDD} \bmod p$$
$$= PSP^{KDD} \bmod p$$
$$= DSK,$$

as is required.

So now every IoT device has a unique DSK and the ODM can also derive these same keys, while no one else can duplicate the keys, including the contract manufacturer. Next, the ODM takes the list of logged UIDs produced by the contract manufacturer and uses smart card 46 to calculate for each UID the corresponding DSK. The created list of pairs of UIDs with corresponding DSKs is then delivered to the service provider. To make this system secure, it needs to be ensured that no one, not contract manufacturer (or anyone else) can clone UIDs and DSKs. As the ICs that contain the UID and the corresponding secret data to calculate the DSK typically do not offer the kind of security and resistance against attacks that is offered by, for example, a high-security smart card IC or a secure element, such as a secure processor, a trade-off has to be made. As long as it can be ensured that an attacker (such as a contract manufacturer) cannot compromise the security of the IC devices on a large scale, the system may be secure enough. However, there will always be the possibility that one or a handful of individual IC devices are compromised. If a contract manufacturer would make use of this information to create clones, this would result in multiple devices sharing the same UID. Such a situation can likely be detected through logging and analysis of the log data and can be mitigated by the blacklisting of such devices.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
    provisioning, by an integrated circuit (IC) manufacturer, an IC device with a unique identification number (UID);
    configuring the IC device to calculate a device-specific key (DSK) using the UID;
    enabling an original device manufacturer to use the UID and a secure application separate from the IC device, to calculate a DSK for the IC device, the DSK calculated using the secure application being the same as the DSK calculated by the IC device;
    providing the UID and the DSK calculated with the secure application separate from the IC device to a provider of an online service, wherein the original device manufacturer is separate from the provider of the online service; and
    enabling the provider of the online service to authenticate the IC device using the UID and the DSK calculated with the secure application in response to the IC device accessing the online service.

2. The method of claim 1, wherein provisioning an integrated circuit (IC) device with a unique identification number (UID) further comprises provisioning a plurality of IC devices, each with a UID.

3. The method of claim 2, further comprising creating a log file of a UID and corresponding DSK for each of the plurality of IC devices.

4. The method of claim 3, wherein creating a log file of a UID and corresponding DSK for each of the plurality of IC devices further comprises providing the log file to the provider of the online service.

5. The method of claim 1, wherein enabling the provider of the online service to authenticate the IC device further comprises enabling the provider of the online service to authenticate the IC device using a predetermined cryptographic challenge-response protocol.

6. The method of claim 1, wherein the IC device is authenticated as a legitimately manufactured IC device when the DSK calculated by the IC device favorably matches the DSK calculated with the secure application.

7. The method of claim 1, wherein provisioning the IC device with the UID further comprises using a wafer tester to provision the IC device with the UID.

8. The method of claim 1, wherein the IC device is characterized as being an internet of things (IoT) device.

9. The method of claim 1, wherein using the UID and a secure application separate from the IC device, calculating a DSK for the IC device further comprises calculating the DSK for the IC device by the original device manufacturer (ODM) using the secure application stored on a smartcard.

10. A method comprising:
provisioning, by an integrated circuit (IC) manufacturer, a plurality of IC devices with unique identification numbers, each of the plurality of IC devices being provided with a unique identification number (UID);
configuring each of the plurality of IC devices to calculate a device-specific key (DSK) using the UID;
enabling an original device manufacturer to use the UID and a secure application separate from the IC device, to calculate a DSK for each of the plurality of IC devices, the DSK calculated using the secure application being the same as the DSK calculated by the IC device;
providing the UIDs and the DSKs calculated with the secure application separate from the IC device to a provider of an online service, wherein the original device manufacturer is separate from the provider of the online service; and
enabling the provider of the online service to authenticate an IC device using the UIDs and the DSKs calculated with the secure application in response to the IC device accessing the online service.

11. The method of claim 10, further comprising creating a log file of a UID and corresponding DSK for each of the plurality of IC devices.

12. The method of claim 11, wherein creating the log file of a UID and corresponding DSK for each of the plurality of IC devices further comprises providing the log file to the provider of the online service.

13. The method of claim 10, wherein enabling the provider of the online service to authenticate the IC device further comprises enabling the provider of the online service to authenticate the IC device using a predetermined cryptographic challenge-response protocol.

14. The method of claim 10, wherein the IC device is authenticated as a legitimately manufactured IC device when the DSK calculated by the IC device favorably matches the DSK calculated with the secure application.

15. The method of claim 10, wherein provisioning the plurality of IC devices with the UIDs further comprises using a wafer tester to provision the plurality of IC devices with the UIDs.

16. The method of claim 10, wherein the IC device is characterized as being an internet of things (IoT) device.

17. The method of claim 10, wherein using the UID and a secure application separate from the IC device, calculating a DSK for the IC device further comprises calculating the DSK for the plurality of IC devices by the original device manufacturer further comprises using a wafer tester to provision the plurality of IC devices with the UIDs.

18. A method comprising:
provisioning, by an integrated circuit (IC) manufacturer, a plurality of IC devices with unique identification numbers, each of the plurality of IC devices being provided with a unique identification number (UID);
configuring each of the plurality of IC devices to calculate a device-specific key (DSK) using the UID;
enabling an original device manufacturer to use the UID and a secure application separate from the IC device, to calculate a DSK for each of the plurality of IC devices, the DSK calculated using the secure application being the same as the DSK calculated by the IC device;
creating a log file of a UID and corresponding DSK for each of the plurality of IC devices;
providing the log file of UIDs and DSKs calculated with the secure application separate from the IC device to a provider of an online service, wherein the original device manufacturer is separate from the provider of the online service; and
enabling the provider of the online service to authenticate an IC device using the UIDs and the DSKs calculated with the secure application in response to the IC device accessing the online service.

19. The method of claim 18, wherein the IC device is authenticated as a legitimately manufactured IC device when the DSK calculated by the IC device favorably matches the DSK calculated with the secure application.

20. The method of claim 18, wherein provisioning the plurality of IC devices with the UIDs is performed by a contract manufacturer that manufactured the plurality of IC devices for an original device manufacturer (ODM).

* * * * *